(12) United States Patent
Wizikowski

(10) Patent No.: US 9,016,532 B2
(45) Date of Patent: *Apr. 28, 2015

(54) HELOSTRAP 525

(71) Applicant: Helo LLC, Tulsa, OK (US)

(72) Inventor: Paul W. Wizikowski, Tulsa, OK (US)

(73) Assignee: Helo LLC, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,081

(22) Filed: Dec. 26, 2013

(65) Prior Publication Data
US 2014/0183888 A1   Jul. 3, 2014

Related U.S. Application Data

(63) Continuation of application No. 12/797,601, filed on Jun. 9, 2010, now Pat. No. 8,616,423.

(51) Int. Cl.
A45F 5/00   (2006.01)
A45C 1/04   (2006.01)
F16M 13/04  (2006.01)
A45C 13/30  (2006.01)
A45F 3/14   (2006.01)

(52) U.S. Cl.
CPC ............ *F16M 13/04* (2013.01); *A45C 13/30* (2013.01); *A45F 5/00* (2013.01); *A45F 2003/142* (2013.01); *A45F 2005/008* (2013.01); *A45F 2200/0525* (2013.01); *Y10S 224/93* (2013.01)

(58) Field of Classification Search
CPC ..... A45F 5/00; A45F 2005/008; A44C 5/003; A45C 1/04

USPC ............ 224/218, 219, 221, 222, 267, 650, 224/901.4, 930

See application file for complete search history.

(56) References Cited

U.S. PATENT DOCUMENTS

| | | | |
|---|---|---|---|
| 4,136,805 A | | 1/1979 | Storms |
| 5,052,602 A | | 10/1991 | Duchi |
| 5,412,545 A | | 5/1995 | Rising |
| 6,360,928 B1 | * | 3/2002 | Russo ........................ 224/218 |
| 6,726,070 B2 | * | 4/2004 | Lautner ...................... 224/221 |
| 7,191,926 B1 | | 3/2007 | Costantino |
| 7,237,756 B2 | * | 7/2007 | Isenberg .................... 248/451 |
| 7,296,752 B2 | * | 11/2007 | Carnevali ............... 235/462.44 |
| 7,469,809 B2 | * | 12/2008 | Rodarte et al. ............. 224/578 |
| 7,942,293 B2 | * | 5/2011 | Lawrence et al. .......... 224/218 |
| D650,531 S | | 12/2011 | Young |
| 8,140,131 B1 | * | 3/2012 | Green ..................... 455/575.1 |
| D673,162 S | | 12/2012 | Young |
| 8,328,055 B1 | * | 12/2012 | Snyder ....................... 224/197 |
| 2004/0226973 A1 | * | 11/2004 | Kao ........................... 224/218 |
| 2007/0205236 A1 | * | 9/2007 | Partusch .................... 224/250 |
| 2008/0017678 A1 | * | 1/2008 | Anderson et al. ........... 224/221 |
| 2009/0219677 A1 | * | 9/2009 | Mori et al. ............... 361/679.03 |
| 2009/0321483 A1 | * | 12/2009 | Froloff ...................... 224/267 |
| 2012/0024917 A1 | | 2/2012 | Case |
| 2012/0327030 A1 | | 12/2012 | Hsieh |

* cited by examiner

*Primary Examiner* — Justin Larson
*Assistant Examiner* — Lester L Vanterpool
(74) *Attorney, Agent, or Firm* — Miles & Stockbridge P.C.; David R. Schaffer

(57) ABSTRACT

The invention attaches a hand strap to a tablet to secure the tablet to the user's hand and act as an aide to prevent a tablet from being dropped. The invention allows the user to rotate the tablet to various viewing angles while still maintaining the secure connection to the tablet. The connection point provides a single yet strong connection between the hand strap and device grip for the two to rotate around each other.

20 Claims, 7 Drawing Sheets

HELOSTRAP 525

CROSS-REFERENCE TO RELATED APPLICATIONS

This application is a continuation of application Ser. No. 12/797,601 filed Jun. 9, 2010 including the specification, drawings and abstract which is hereby incorporated herein by reference in its entirety.

BACKGROUND OF THE INVENTION

The invention is a holding or carrying aide. It provides a user with a hand strap which easily attaches to a tablet and allows the tablet to rotate freely in the user's hand. With the advancement of expensive handheld electronic tablets (e.g., an "iPad"®), the need to be able to securely hold and stabilize tablets without the risk of dropping them has increased significantly. No prior inventions address the issue of being able to hold a tablet (electronic or otherwise) in this manner.

BRIEF SUMMARY OF THE INVENTION

The invention is a mechanical device used to grip or secure flat rectangular objects (tablets) for hand-held use and allows them to rotate freely in the user's hand. The invention is a device which secures to a tablet (electronic or otherwise) and provides a hand strap to secure the tablet to the user's hand. The Hand Strap is connected to a strap secured on the device (Device Grip) by a pivot point which allows the user to rotate the tablet to different viewing angles without changing their hand position. The Device Grip is secured to the tablet by two circular bands of stretchable material (rubber or elastic) on each end of the Device Grip. Both bands of one end extend around one corner of the tablet while the bands on the other end of the Device Grip extend around the corner of the tablet diagonally across from the first corner.

DETAILED DESCRIPTION OF THE INVENTION

The invention is a mechanical device used to grip or secure flat rectangular objects (tablets) for hand-held use. The invention is a device which secures to a tablet (electronic or otherwise) and provides a hand strap to secure the tablet to the user's hand. The Hand Strap is connected to a Device Grip (a strap secured on the tablet) by a pivot point which allows the user to rotate the tablet without changing the angle of the hand strapped to the device. The Device Grip is secured to the tablet by two circular bands of stretchable material (rubber or elastic) on each end of the Device Grip. Both bands of one end extend around one corner of the tablet while the bands on the other end of the Device Grip extend around the corner of the tablet diagonally across from the first corner.

The Hand Strap

Figure 2A:
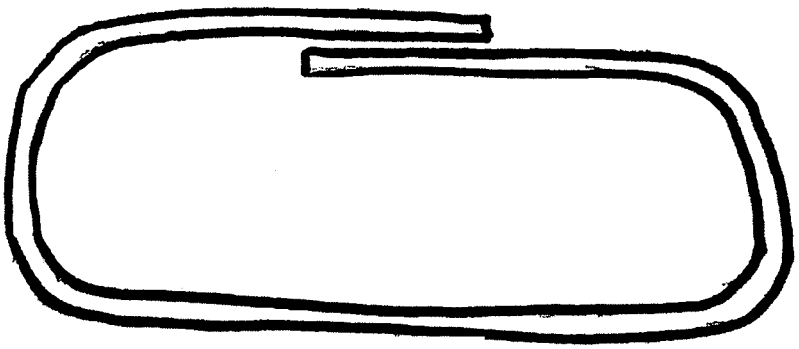
FIG. 2A is a side view of a hand strap that is designed to wrap around a user's hand and attach to itself to ensure a secure fit for various hand sizes, in accordance with an embodiment of the present invention.
Figure 2B:
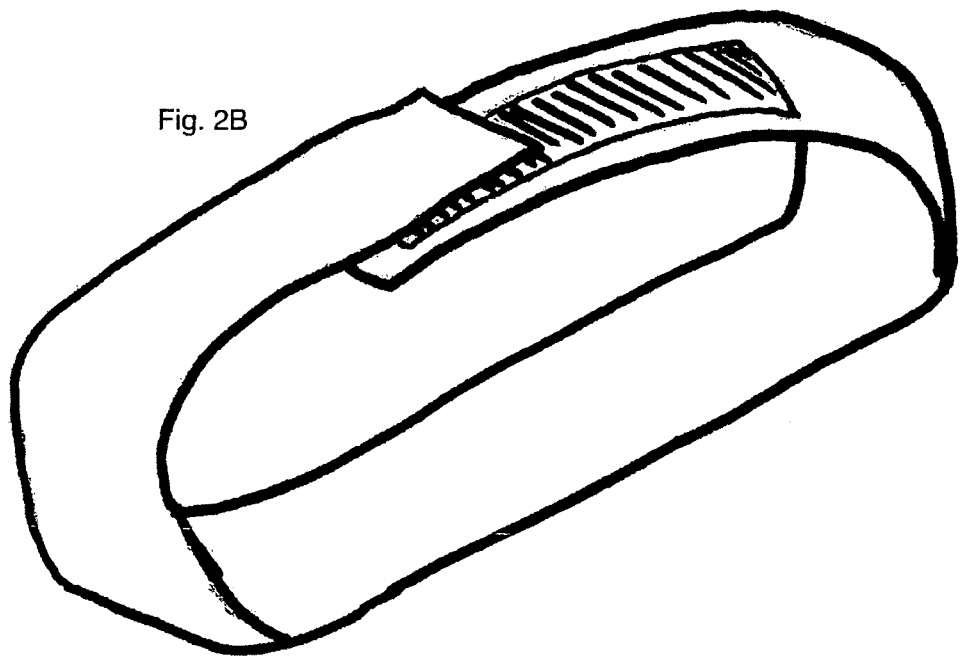
FIG. 2B is a top perspective view of the hand strap of FIG. 2A that is designed to wrap around a user's hand and attach to itself ensuring a secure fit for various hand sizes, in accordance with an embodiment of the present invention.

The Hand Strap is a strip of material which contains hook and loop closures placed on either end of the strap. (See, FIGS. 2A and 2B.) When the strap is stretched flat on a solid surface, the hook material shall be attached on one end of the strap facing down. The loop side of the closure material shall be attached to the opposite end of the strap facing up. The Hand Strap is constructed to allow a wide variety of hand sizes to be accommodated.

Figure 3A:
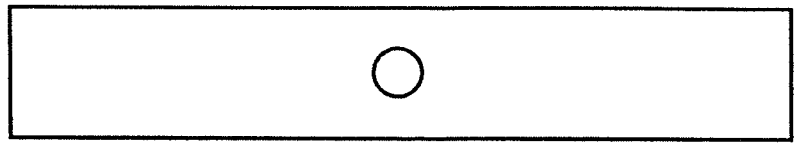
FIG. 3A is a top view of a female portion of a rotatable connecting point, in accordance with an embodiment of the present invention.
Figure 3B:
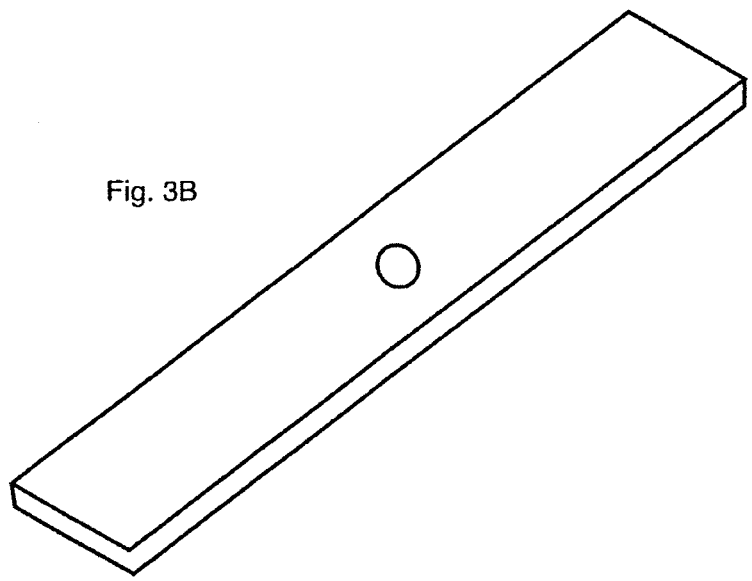
FIG. 3B is a top perspective view of the female portion of the rotatable connecting point, in accordance with an embodiment of the present invention.
Figure 3C:
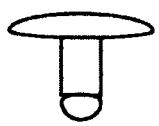
FIG. 3C is a side view of a male portion of the rotatable connecting point, in accordance with an embodiment of the present invention.
Figure 4:
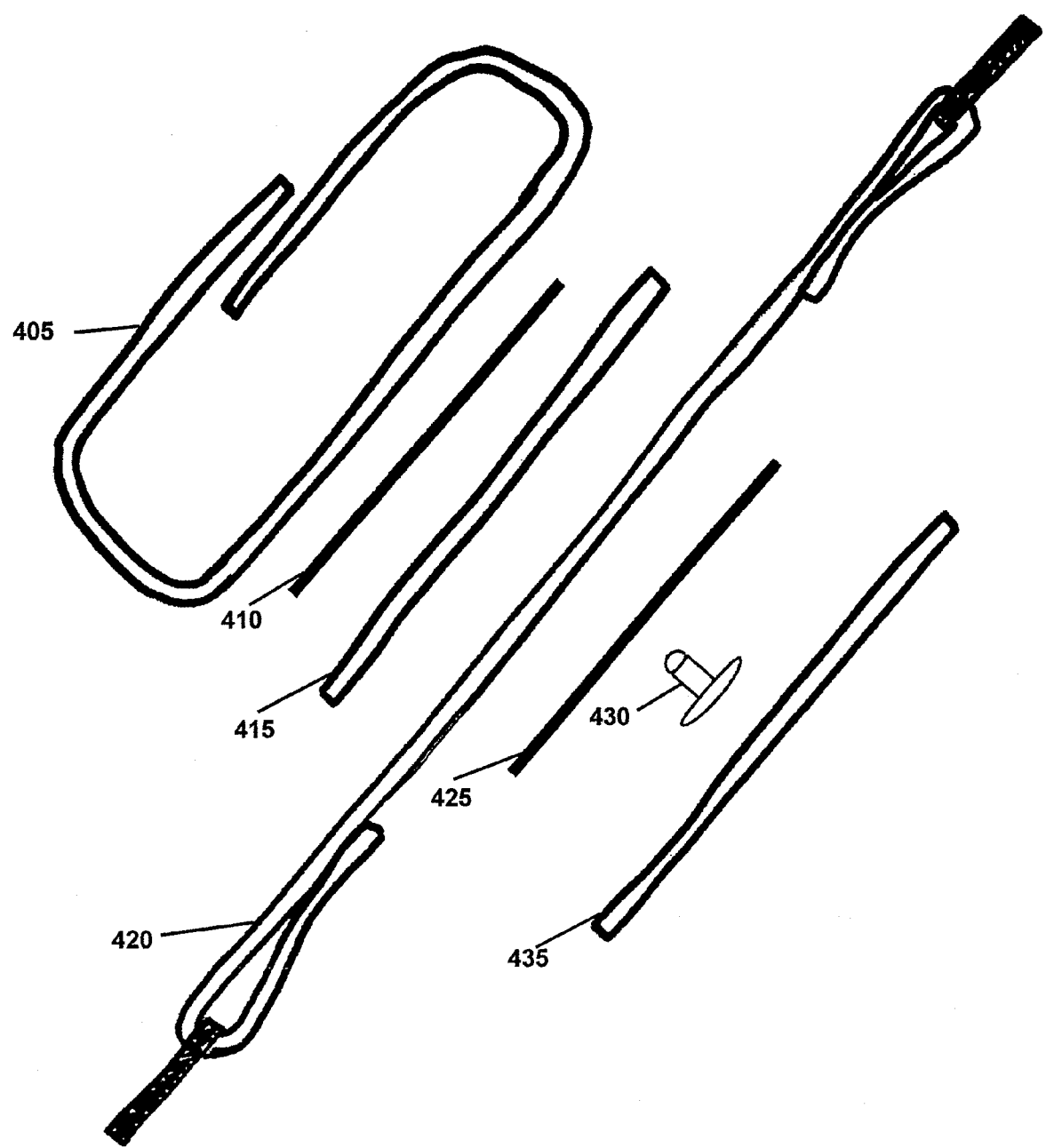
FIG. 4 is a side, exploded view of a gripping device, in accordance with an embodiment of the present invention. The gripping device includes a HAND STRAP component 405, a ROTATABLE CONNECTING POINT Base Plate 410, a Covering Material 415 sewn against the base of the HAND STRAP, a DEVICE GRIP 420, a ROTATABLE CONNECTING POINT Base Plate 425 for the Device Grip, a ROTATABLE CONNECTING POINT Connecting Device, and a "Covered Material" sewn against the base of the DEVICE GRIP that conceals the RDPs Device Grip Base Plate.

In the center of the Hand Strap, one half of its length, as measured from either end, the female end of a Rotatable Connecting Point is placed on the underside of the Hand Strap. (See, FIG. 4.) The Rotatable Connecting Point ("RCP") is a device which rotates freely about itself. Where one half is connected to one item, and the other half is connected to a different item, the items are allowed to rotate freely about each other, similar to a snap used to secure clothing. However, once the two halves are joined the RCP will not easily disengage. (See, FIG. 3.)

A covering material is placed under the female end of the RCP with a hole which allows the female end of the RCP to receive the male end of the RCP. The covering material is then attached (sewn or bonded) to the Hand Strap, thus holding the female end of the RCP firmly against the Hand Strap. (See, FIG. 4.)

The Device Grip

The Device Grip is the portion with attaches to the tablet. Through the RCP it also attaches to the Hand Strap, and consequently the user's hand. Thus, the invention secures the tablet to the user's hand, while still allowing it to rotate freely about one axis.

The Device Grip is secured to the tablet by two circular bands of stretchable material (rubber or elastic) on each end of the Device Grip. Both bands of one end extend around one corner of the tablet while the bands on the other end of the Device Grip extend around the corner of the tablet diagonally across from the first corner.

Figures 1A, 1B:
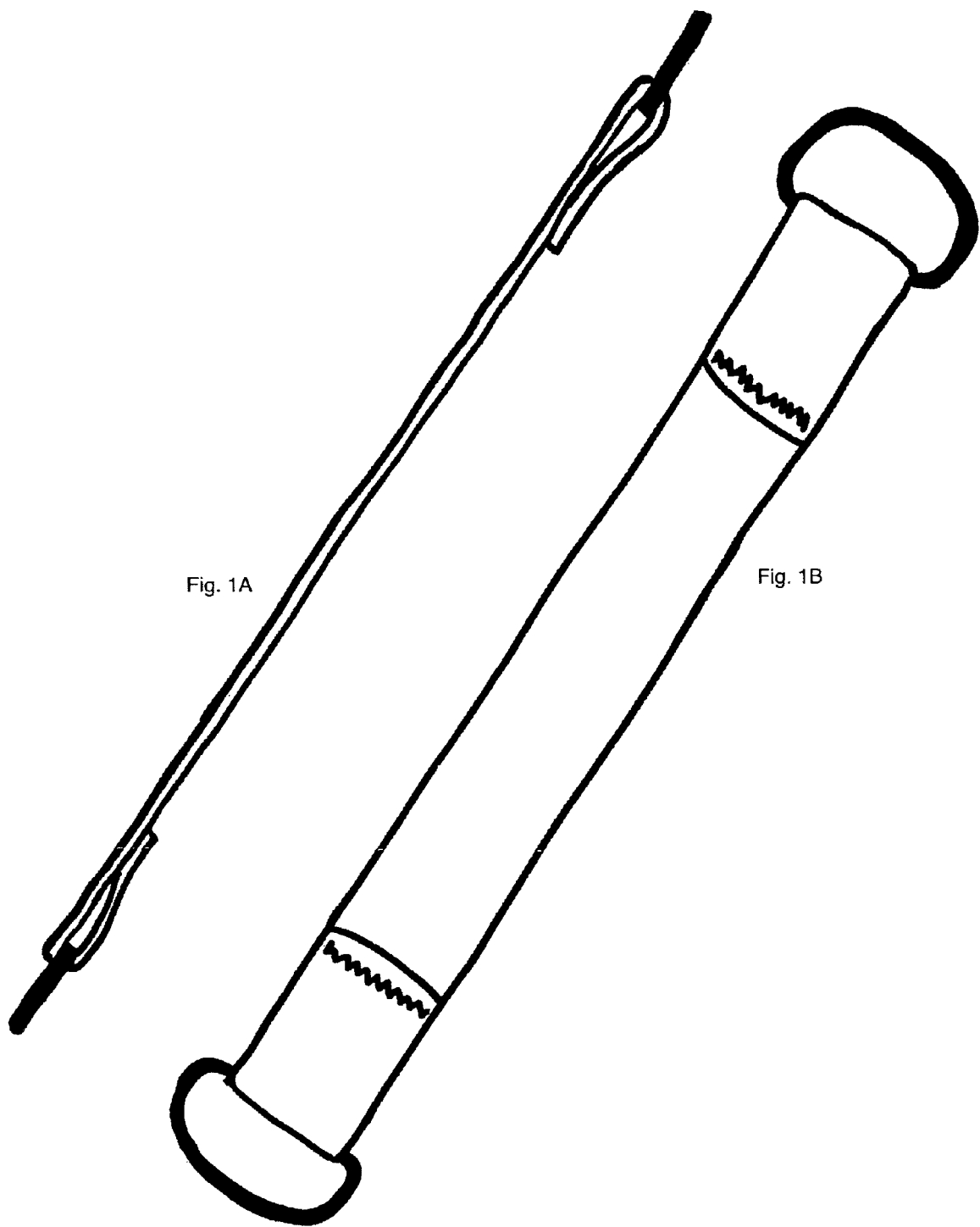
FIG. 1A is a side view of a gripping device with each end of a main piece of material wrapping around respective stretchable loops on each end and folding back under itself, in accordance with an embodiment of the present invention.
FIG. 1B is a top view of the gripping device of FIG. 1A with each end's loop being doubled up to ensure added security and tension, in accordance with an embodiment of the present invention.

The Device Grip is a strip of material which is looped back upon itself on both ends by 1.5" and sewn closed (thus forming looped ends). (See, FIG. 1.) Before being sewn, two bands of stretchable material (i.e. elastic or rubber) are passed through each end of the Device Grip. When each end is sewn to form a looped end, each end will have two bands contained within the looped end.

When the strap is stretched flat on a solid surface, the ends of the Device Grip which sewn will be facing down. (See, FIG. 4.) In the center of the Device Grip, one half of its length, as measured from either end, the male end of a RCP is placed on the underside of the Device Grip. (See, FIG. 4.) The male end of the RCP will be pointing up, and protrude through the Device Grip with sufficient length to allow it to attach to the female end of the RCP.

A covering material is placed under the male end of the RCP. The covering material is then attached (sewn) to the Device Grip, thus holding the male end of the RCP firmly against the Device Grip. (See, FIG. 4.)

Final Assembly

The Hand Strap and the Device Grip are joined together by the RCP when the two ends of the RCP are connected.

Usage

To use the invention, stretch the two loops of stretchable material around one corner of the device. Then, lay the Device Grip side diagonally across the back of the tablet, and stretch the two loops of stretchable material around the corner of the device (the one diagonally opposite from the first). (See, FIG. 4.) The user will then place their hand, palm-side toward the tablet, and secure the hand strap across the back of their hand.

Alternate

Figure 5:
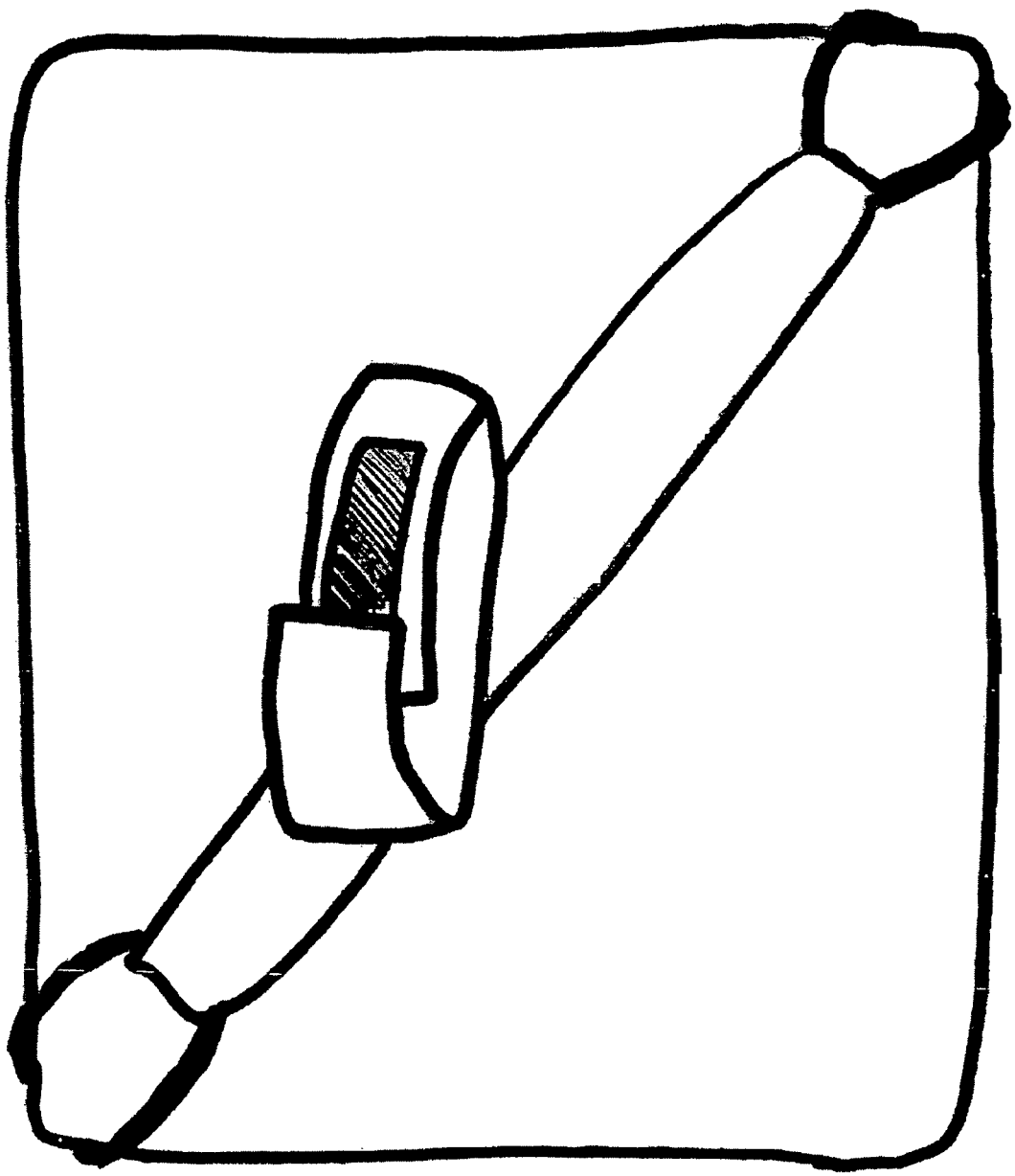
FIG. 5 is a rear view of a gripping device affixed to a tablet, for example, but not limited to, a handheld electronic tablet, in accordance with an embodiment of the present invention.
Figure 6:
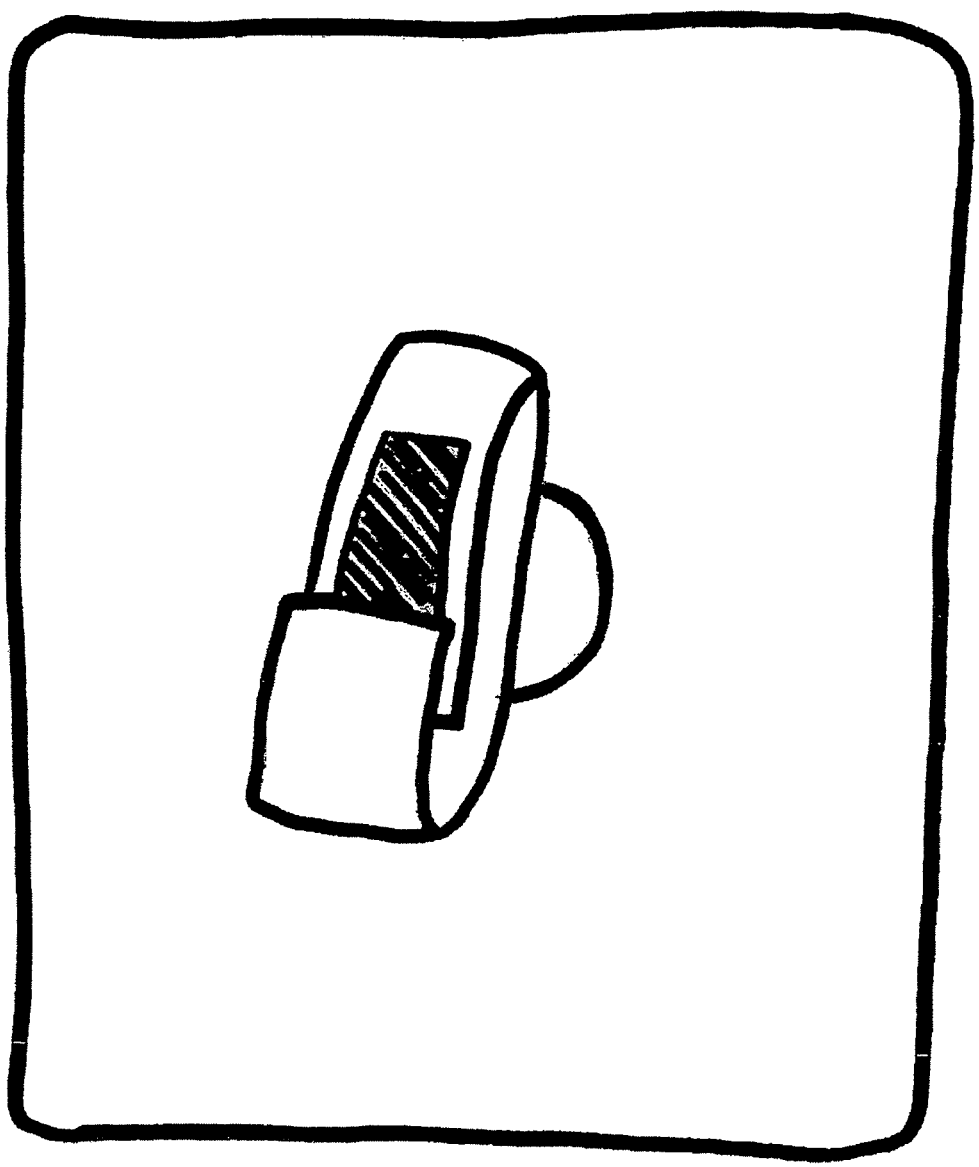
FIG. 6 is a rear view of a gripping device utilizing a sleeve, cover or a hardened cover case with an attached hand strap, in accordance with an embodiment of the present invention.
Figure 7:
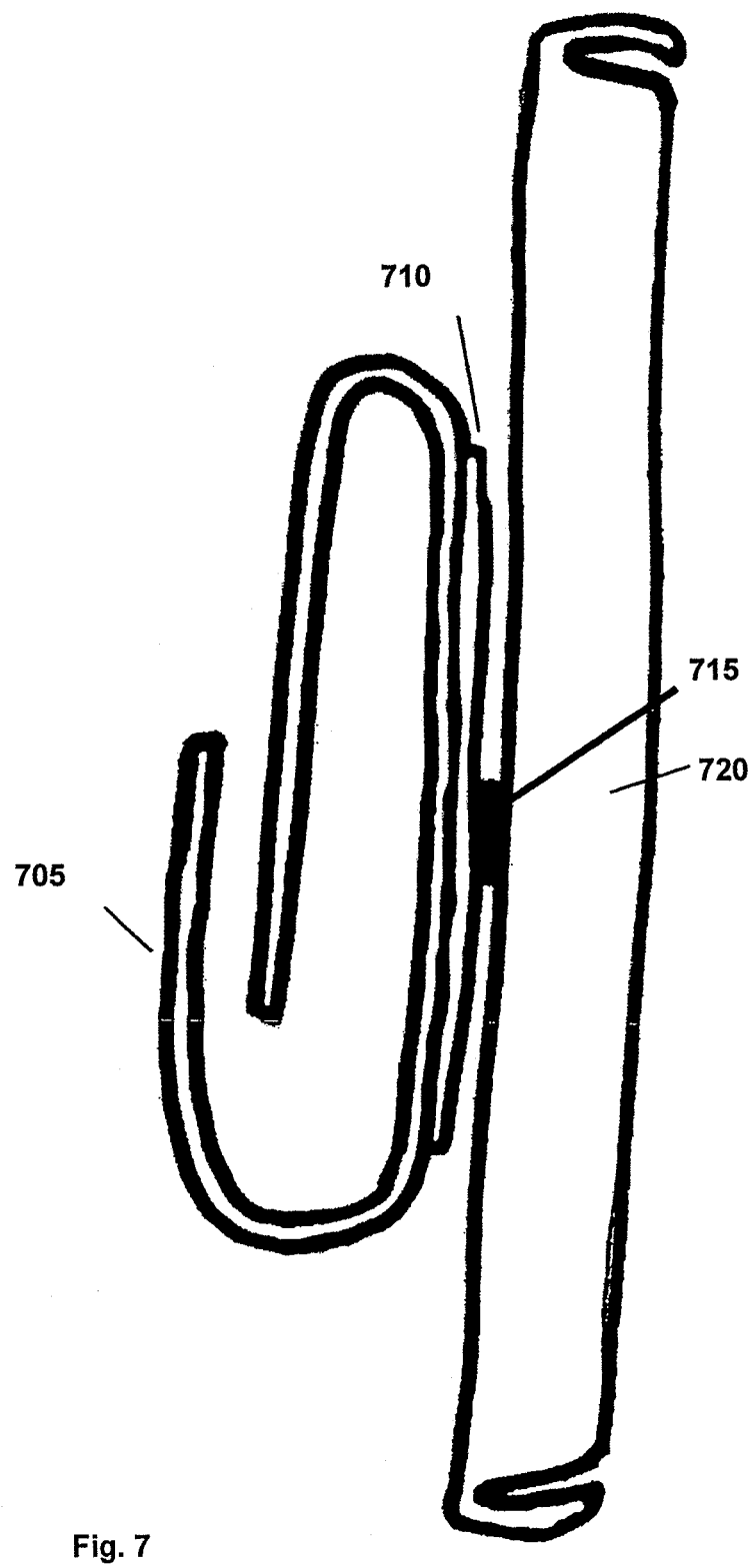
FIG. 7 is a side view of a helo strap utilizing a sleeve, cover, or hardened cover case with an attached rotatable helo strap, in accordance with another embodiment of the present invention. The helo strap includes four components: a hand strap 705, a covering material 710, a rotatable connecting point 715, and a sleeve, cover, or hardened cover case 720.

The Hand Strap is connected to a material surrounding a tablet consisting of a sleeve, cover, or hardened case, similar to cellular telephone cases. (FIGS. 5 and 6.) The Hand Strap is connected to the cover via the RCP. Once the cover is placed on the tablet, the Helostrap is secured and ready for use.

The invention claimed is:

1. A device comprising:
   a unitary strap having opposite end portions folded back on and rigidly affixed to the unitary strap where each end portion encircles and holds a portion of a stretchable circular band;
   a hand strap;
   a connection point having two halves rotably connected to each other in a middle of the connection point between the halves and a first of the halves being fixedly attached to the unitary strap and a second of the halves being fixedly attached to the hand strap; and
   the connection point first half being fixedly attached to the unitary strap with a first cover piece of material, and the connection point second half being fixedly attached to the hand strap with a second cover piece of material.

2. The device of claim of claim 1 wherein the connection point first half includes a male connection component and the connection point second half includes a female connection component with configured to receive and rotatably hold the male connection component.

3. The device of claim 1 wherein the hand strap comprises a strip of material with a loop fastener material attached at a first location and a hook fastener material attached at a second location.

4. The device of claim 1 wherein each stretchable band is configured to fit over and be removably affixed to diagonally opposite corners of the rectangular object.

5. The device of claim 4 wherein the rectangular object is a tablet.

6. The device of claim 1 wherein the connection point comprises:
   a first half flat body portion from which the male connection component extends substantially perpendicularly from substantially a center of the first half flat body portion; and
   a second half flat body portion from which the female connection component extends substantially perpendicularly from substantially a center of the second half flat body portion.

7. The device of claim 6 wherein the first half flat body portion and the second half flat body portion each has a substantially elongated rectangular shape.

8. A device comprising:
   a unitary strap having opposite end portions folded back on and rigidly affixed to the unitary strap where each end portion encircles and holds a portion of a stretchable circular band;
   a hand strap, the hand strap including a strip of material with a loop fastener material attached to the hand strap and a strip of hook fastener material separately attached to the hand strap;
   a connection point having two halves rotably connected to each other in a middle of the connection point between the halves and a first half being fixedly attached to the unitary strap and a second half being fixedly attached to the hand strap, the first half including a male connection component and the second half including a female connection component configured to receive and rotatably hold the male connection component; and
   the connection point first half being fixedly attached to unitary strap with a first cover piece of material that, and the connection point second half being fixedly attached to the hand strap with a second cover piece of material.

9. The device of claim 8 wherein each stretchable band is configured to fit over and be removably affixed to diagonally opposite corners of the rectangular object.

10. The device of claim 8 which the rectangular object is a tablet.

11. The device of claim 8 wherein the connection point first half comprises:
   a first half flat body portion from which the male connection component extends substantially perpendicularly from substantially a center of the first half flat body portion.

12. The device of claim 11 wherein the first half flat body portion has a substantially rectangular shape.

13. The device of claim 12 wherein the connection point second half comprises:
   a second half flat body portion from which the female connection component extends substantially perpendicularly from substantially a center of the second half flat body portion.

14. The device of claim 13 wherein the second half flat body portion has a substantially rectangular shape.

15. A device comprising:
   a unitary strap having opposite end portions folded back on and rigidly affixed to the unitary strap where each end portion encircles and holds a portion of a stretchable circular band and each stretchable band being configured to fit over and be removably affixed to a diagonally opposite corner of the rectangular object;

a hand strap, the hand strap including a strip of material with a loop fastener material attached to the hand strap and a hook fastener material separately attached to the hand strap; and a connection point having two halves rotably connected to each other in a middle of the connection point between the halves and a first half being fixedly attached to the unitary strap and a second half being fixedly attached to the hand strap, the first half including a male connection component and the second half including a female connection component configured to receive and rotatably hold the male connection component, and the connection point first half being fixedly attached to the unitary strap with a first cover piece of material that extends past and covers an outer perimeter of the connection point first half, and the connection point second half being fixedly attached to the hand strap with a second cover piece of material that extends past and covers an outer perimeter of the connection point second half.

16. The device of claim 15 wherein the connection point first half comprises:

a first half flat body portion from which the male connection component extends substantially perpendicularly from substantially a center of the first half flat body portion.

17. The device of claim 16 wherein the first half flat body portion has a substantially rectangular shape.

18. The device of claim 17 wherein the connection point second half comprises:

a second half flat body portion from which the female connection component extends substantially perpendicularly from substantially a center of the second half flat body portion.

19. The device of claim 18 wherein the second half flat body portion has a substantially rectangular shape.

20. The device of claim 15 wherein the male connection component includes a plurality of ribbed elements and the female connection component includes a plurality of reciprocally ribbed elements.

* * * * *